Oct. 15, 1963   H. J. McSKIMIN   3,107,329
METHOD AND APPARATUS FOR MEASURING TIME
DELAY IN TRANSMISSION PATHS
Filed Aug. 29, 1960   4 Sheets-Sheet 1

INVENTOR
H. J. McSKIMIN
BY
H. O. Wright
ATTORNEY

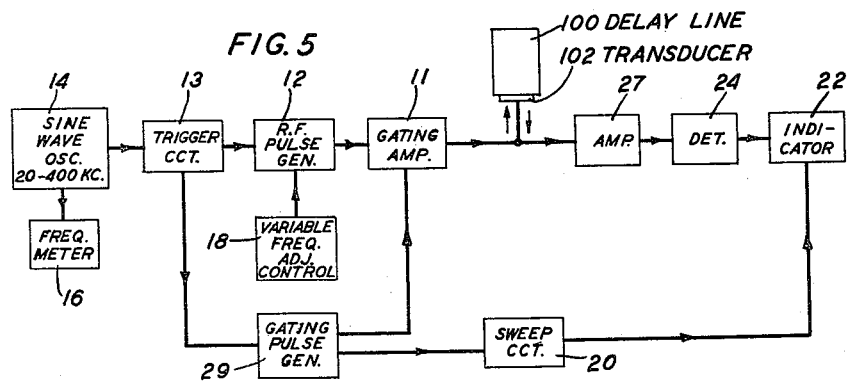
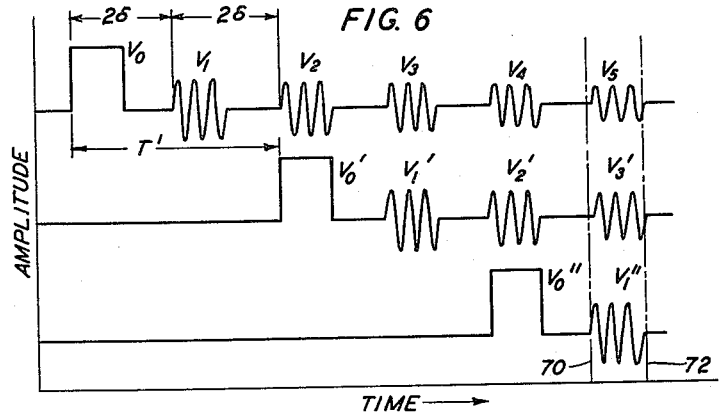
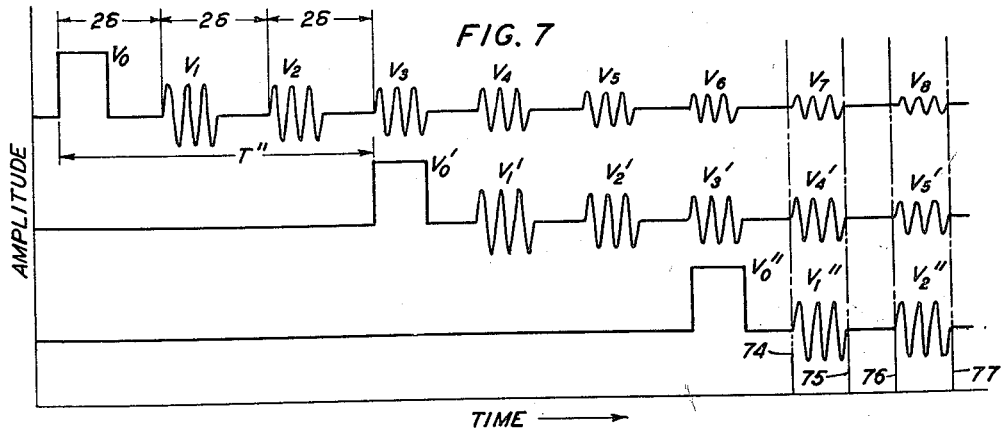

Oct. 15, 1963     H. J. McSKIMIN     3,107,329
METHOD AND APPARATUS FOR MEASURING TIME
DELAY IN TRANSMISSION PATHS

Filed Aug. 29, 1960     4 Sheets-Sheet 4

INVENTOR
H. J. Mc SKIMIN
BY
H. O. Wright
ATTORNEY 3,107,329
METHOD AND APPARATUS FOR MEASURING TIME DELAY IN TRANSMISSION PATHS
Herbert J. McSkimin, Basking Ridge, N.J., assignor to Bell Telephone Laboratories, Incorporated, New York, N.Y., a corporation of New York
Filed Aug. 29, 1960, Ser. No. 52,407
10 Claims. (Cl. 324—58)

This invention relates to measuring methods and apparatus. More particularly, it relates to measuring methods and apparatus which involve the relative timing of alternating energy pulses.

The term "alternating energy" is defined for the purposes of this application as energy of any kind varying in regular, substantially sinusoidal manner with time between "positive" and "negative" maxima. For the illustrative embodiments described in detail hereinunder, by way of example, electrical circuits employing alternating current are combined with ultrasonic delay media interconnected with the electrical circuits by electromechanical transducers which convert sinusoidally varying alternating current electrical energy into similar alternating acoustic energy and vice versa.

It is known in the prior art to determine the delay of a specific transmission path by transmitting a periodically repeated energy pulse over the path and synchronizing a second periodically repeated energy pulse of the same repetition rate but of adjustable known timing or delay with the pulse transmitted over the path to obtain an indication of the delay of the path.

In many instances, for obvious reasons, it is desirable to determine the delay of the transmission path in a particular frequency range. For example, one important range is the radio frequency range, which of course includes very high frequencies, for example, 20 megacycles per second or more. This can be achieved by transmitting a periodically repeated alternating energy pulse of the very high frequency over the path and thereafter superimposing upon it, or precisely synchronizing with it, an identical very high frequency alternating energy pulse periodically repeated at the same repetition rate but of adjustable known delay with respect to the first periodically repeated pulse.

For such systems, precise measurement of delay requires exact alignment in time of the pulses being synchronized to the extreme that even the corresponding cycles of the radio frequency of the two pulses being superimposed occur simultaneously.

It is well known that expensive apparatus having extremely broad frequency band characteristics must be employed if the steep leading edge of such a pulse and all individual periods or cycles of the pulse are to be reproduced without objectionable distortion as required in a number of representative prior art arrangements designed for measuring the delay of a transmission path or the like by methods similar to that indicated above. Of course, if appreciable distortion occurs, corresponding points on the leading edges or on specific individual periods or cycles of two or more pulses cannot be accurately identified.

In the methods and apparatus of the present invention, as will presently become apparent, synchronism can be determined by comparison of the more centrally positioned portions of the pulses and, accordingly, relatively much more narrow frequency band apparatus can be employed without sacrifice of precision. For example, arrangements of the invention yield extremely precise results with a bandwidth which need not be greater than approximately unity divided by the pulse width.

In testing for the precise superposition or synchronization of the corresponding periods or cycles of the alternating energy of the pulses being synchronized in accordance with arrangements of the present invention, the radio frequency of the pulses is changed between two or more frequencies, which frequencies differ moderately from each other, as for example, by approximately ten percent. Precise superposition is indicated, as will be explained in detail hereinunder, at that adjustment for which no change in the amplitude of the indication obtained occurs when the radio frequency of the pulses is changed moderately, as mentioned above. This eliminates the necessity of obtaining the high degree of resolution and the use of very wide frequency band apparatus required by prior art systems in which the leading edge or even individual periods of the pulses must be developed.

A principal object of the invention, therefore, is to simplify the methods and apparatus for obtaining precise delay measurements.

A further object is to facilitate the accurate determination of delay.

Another object is to facilitate the accurate determination of the exact synchronization of two substantially identical periodically repeated alternating energy pulses.

A still further object is to reduce the time and apparatus investments required to make precise delay measurements.

Yet another object is to reduce the width of the frequency band required to obtain exact synchronization of two periodically repeated alternating energy pulses.

Other and further objects, features and advtantages of the invention will become apparent during the course of the following detailed description of specific illustrative arrangements of the invention.

In the drawings:

FIG. 5 illustrates in block schematic diagram form a second simple arrangement of the invention specifically intended for determining the delay of a delay device having a transducer at one end only;

FIG. 6 is a diagram illustrative of the operation of a first timing arrangement of the pulses for a system as illustrated in FIG. 5;

FIG. 7 is a diagram illustrative of the operation of a second timing arrangement of the pulses for a system as illustrated in FIG. 5.

Figure 1:
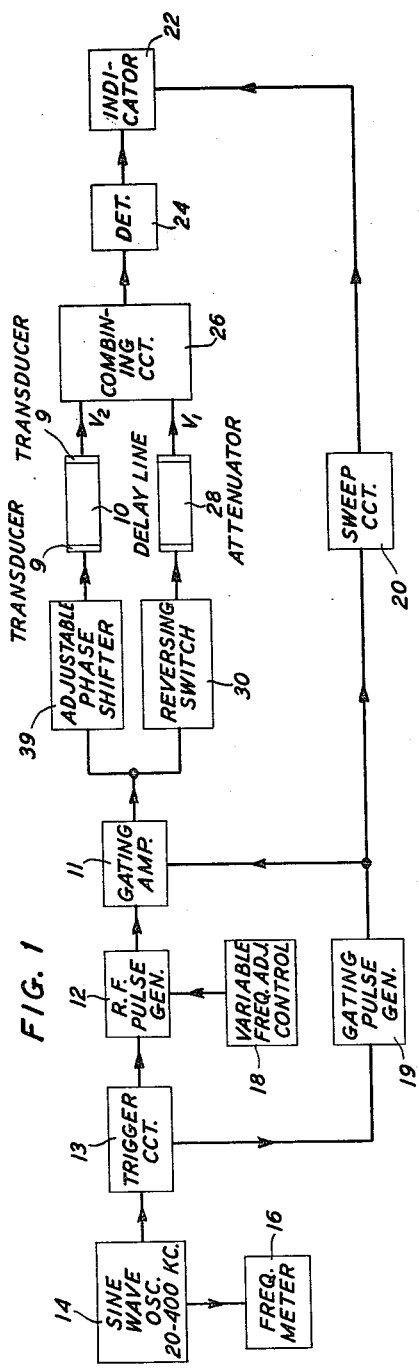
FIG. 1 illustrates in block schematic diagram form a first simple arrangement of the invention specifically intended for determining the delay of a delay line.

In more detail in FIG. 1, block 10 having an electromechanical transducer 9 at each end represents, by way of illustration, a transmission path which in a typical case can be a conventional ultrasonic delay line the delay of which at a preselected frequency is to be measured.

Alternatively, it will presently become apparent that the delay of any transmission path including, for example, a path traversed by radio pulses in a radio direction and range finding system, or by sound impulses in a "sonar" system, or the like, can be measured by application of the principles of the invention. In such systems, of course, the transmitter and receiver comprise the "transducers" and the path of the exploratory pulses is the "delay line".

Block 14 represents, for example, a simple L-C oscillator of conventional design having a short-time drift in frequency characteristically, for example, of less than one part in 100,000. Oscillator 14 is of adjustable frequency and can generate sinusoidal electrical alternating current waves of any frequency within the range, for example, of 20 kilocycles to 400 kilocycles per second. The output of this oscillator actuates a conventional trigger circuit 13. Circuit 13 "squares" the sinusoidal wave from oscillator 14 and employs the steeply rising edges of the squared wave to actuate a gas "thyratron" tube. Thus circuit 13 provides a plurality of trigger or timing pulses, each having a steep leading edge, the pulses regularly recurring at a rate and spacing in time determined by the frequency to which oscillator 14 is adjusted. Associated with oscillator 14 is a frequency meter 16 which indicates the frequency to which oscillator 14 is adjusted.

The radio frequency pulse generator 12 generates a succession of identical radio frequency pulses spaced accurately in accordance with the timing pulses from circuit 13. Each radio frequency pulse is identical with preceding pulses and starts at the same point in a period or cycle of the radio frequency, that is, all pulses have identical phase variations. This is necessary for reasons which will become apparent as the description proceeds. Such pulse generators are well known and widely used by those skilled in the art and have, for example, been described in United States Patents 2,426,216 granted August 26, 1947, to S. C. Hight, and 2,422,205 granted June 17, 1947, to L. A. Meacham, and in a number of other publications. This general type of pulse generator includes a resonant or oscillatory circuit tuned to the desired radio frequency and means for shock exciting and subsequently quenching the resonant circuit. It also preferably includes means for feeding back energy to sustain a constant amplitude of oscillation in the resonant or oscillatory circuit during its active periods.

Radio frequency pulse generator 12 generates pulses having a duration, for example, of five microseconds and a radio frequency, for example, of 20 megacycles per second. In one method of operation the radio frequency of the pulses may be moderately adjusted whenever desired, by frequency adjusting means 18. For example, the frequency may be changed at will between the above suggested normal value of 20 megacycles and a frequency approximately ten percent lower as, for example, to 18 megacycles.

Alternatively, for specific purposes to be described hereinunder, the radio frequency of the pulses can be continuously varied or swept through a moderately wide band of frequencies by the frequency adjusting means 18 as, for example, between 18 and 20 megacycles or between plus and minus five percent of the frequency 20 megacycles.

The pulses from generator 12, when gating amplifier 11 is unblocked or "opened" by appropriate pulses from pulse generator circuit 19, are amplified, passed and applied by amplifier 11 to the inputs of both the delay line 10 and the attenuator 28. Attenuator 28 has the same attenuation as line 10 so that portions of the pulses from generator 12 passing through these two units arrive at circuit 26 with equal amplitudes. Attenuator 28, typically, will have a small phase shift which is balanced out by adjusting phase shifter 39 (in series with delay line 10) to the same value. A "pole reversing" switch 30 in series with the attenuator, for example, makes possible the changing of the relative phase of the outputs of the delay line 10 and attenuator 28 by 180 degrees whenever desired, as will be discussed presently.

In one specific arrangement of the type illustrated in FIG. 1, the gating pulse generator circuit 19 provides a gate pulse to amplifier 11 of such duration that two successive alternating current pulses from generator 12 are passed whereupon the amplifier 11 is disabled (that is, the "gate" is closed) for a period several times as long as the open period and the above-described cycle of events is then repeated. The reasons for this mode of operation will become apparent hereinunder.

Pulse portions from delay line 10 and attenuator 28 are applied to combining circuit 26 and when these pulse portions are applied in at least approximate concurrence from these units, as will be described in detail hereinunder, they are combined and the combination is thereafter detected in detector 24 the output of which is applied to indicator 22.

Irrespective of the relative amplitudes of the two pulses, if they are otherwise identical exact synchronism of the pulses will, of course, produce a maximum indication when the pulses are added as for one position of switch 30 and a minimum indication if they are subtracted as for the other position of switch 30. If the two pulses are of exactly equal amplitude, adjustment to precise synchronism of the two pulses when subtracted from each other should obviously result in a zero amplitude indication, and when added to each other the amplitude of the sum should obviously be double that of either pulse alone. (Addition or subtraction of the pulses can be effected also by attaching the transducers 9 to the ends of line 10 so that they are either operating in phase or in opposition, respectively, as is well known to those skilled in the art.) As a practical matter, complete, or nearly complete, cancellation of the pulses may, in general, be more easily determined than the exact maximum produced by adding the pulses. Obviously, the principles involved are substantially equivalent and the operator may select either method of combining pulses which he deems more appropriate in any specific situation.

Indicator 22 can be, for example, a conventional cathode ray oscilloscope having horizontal and vertical deflecting plates, the horizontal deflecting plates of which are connected to sweep circuit or generator 20, the latter being synchronized with the pulses from generator 12 by gating pulses from circuit 19. Circuit 19 in turn is actuated by pulses from trigger circuit 13, as indicated.

The output of detector 24 is applied, for example, to the vertical deflecting plates of indicator 22. The control pulses applied to sweep circuit 20 are synchronized with the pulses effecting the opening of gating amplifier 11 so that the sweep of the oscilloscope beam is effected during a time interval following each control pulse. This interval is selected, by appropriately timing the initiation and duration of the sweep, so that particular pulses only, as will be described in detail below for the several illustrative arrangements of the drawings, appear on the trace of the cathode ray indicator. Numerous gating and timing arrangements of the above-mentioned types are well known and extensively used by those skilled in the electronic control circuit art and, accordingly, are not shown and described in detail in this application.

Figure 2:
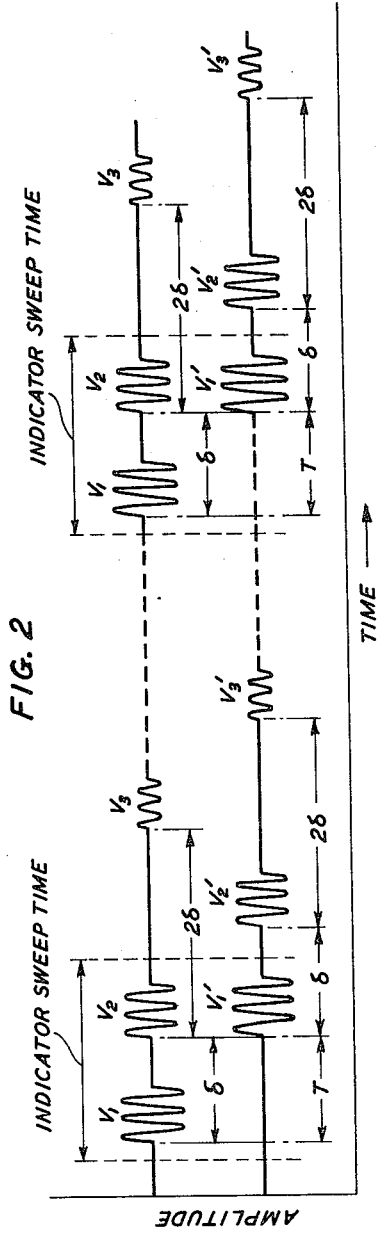
FIG. 2 is a diagram illustrative of a method of operation of the arrangement of FIG. 1.

Turning now to FIG. 2, if $V_1$, at the extreme left, is assumed to represent a portion of an initial pulse $V_0$ from generator 12 which has been transmitted through attenuator 28 to combining circuit 26, then pulse $V_2$ adjacent to $V_1$ and subsequently reaching circuit 26 after a time delay of $\delta$ equal to the delay of line 10, represents a second portion of the same pulse $V_0$ arriving at combining circuit 26 after passing through delay line 10.

If the time interval T between two successive pulses $V_0$ and $V_0'$ from generator 12 is made equal to $\delta$, by adjustment of the frequency of oscillator 14, then the next successive pulse portion $V_1'$ from generator 12 via attenuator 28 will arrive at combining circuit 26 simultaneously with the delayed portion $V_2$ of the preceding pulse as illustrated in FIG. 2, to the left. Similarly, the delayed portion $V_2'$ of the second pulse will arrive via delay line 10 at circuit 26 after a delay time $\delta$ with respect to pulse $V_1'$.

Echoes such as $V_3$ and $V_3'$ of pulse portions $V_2$ and $V_2'$, respectively, resulting from reflections at the ends of delay line 10, having decreasing amplitudes as indicated, will also arrive subsequently at combining circuit 26 at multiples of twice the delay time δ but if the indicator 22 terminates its sweep before the arrival of pulses $V_3$ and $V_2'$, these echo pulses and subsequent echo pulses of further decreased amplitude spaced at intervals of 2δ will not affect the indication appearing on the indicator.

When the echo pulses have subsided to a negligible amplitude (which may require less than 100 microseconds), the whole process is repeated, as indicated to the right in FIG. 2. That is, two pulses, $V_0$ and $V_0'$, are again passed by gating amplifier 11 under control of pulses from gating circuit 19 and portions of these pulses $V_2$ and $V_1'$ will arrive at combining circuit 26 substantially in synchronism, as illustrated in FIG. 2, to the right, so that a visual presentation of pulse portion $V_2$ combined with the simultaneously arriving pulse portion $V_1'$ will be created on the oscilloscope screen.

The sweep time can be as illustrated in FIG. 2 in which case pulse portion $V_1$ will first appear as a "pilot" or preliminary indication on the oscilloscope trace followed at an interval T by the above indicated combined pulses. Alternatively, the sweep time obviously may be restricted to substantially the interval or "time-slot" in which $V_2$ and $V_1'$ occur simultaneously. The combination of pulses $V_2$ and $V_1'$, with the switch 30 in the appropriate position to add these pulse portions, will obviously produce a maximum amplitude indication on the oscilloscope screen when they are precisely in phase, that is, when T is precisely equal to δ. Alternatively, if the reversing switch 30 is operated to cause these pulse portions to subtract from each other a minimum or even a zero indication should be obtained. In the latter instance it should be noted that the use of the longer sweep providing the "pilot" or preliminary indication (pulse portion $V_1$) as described above has the virtue of positively indicating that the circuit is functioning since obviously a "zero indication" would also be obtained if no pulses were being passed by gating amplifier 11. In accordance with the invention, the accuracy of the adustment can be checked by changing the frequency of the pulses by a moderate amount. The principle involved will be explained in detail below in connection with the diagrams of FIGS. 3 and 4.

It should be understood that in FIGS. 2, 3, 4, 6, 7 and 8, inclusive, idealized pulses of a limited number of periods or cycles each (the periods or cycles of each pulse being undistorted and of equal amplitudes) are shown in order to simplify illustration of the principles of the invention. Since an object of the invention is to reduce the frequency bandwidth which circuits of the invention must transmit, in an actual circuit of the invention the pulse shape may depart substantially from the idealized pulse. This will not however detract from the accuracy attainable provided all pulses have substantially identical envelope shapes. In general, "echo" pulses will be substantially replicas of original pulses except that they will be of reduced amplitudes.

Figure 3:
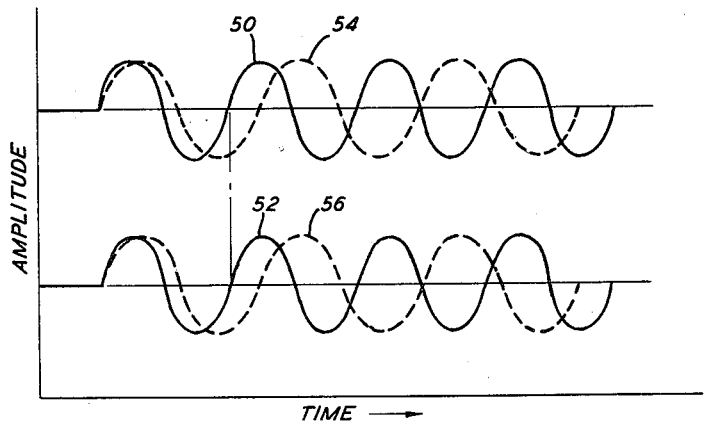
FIG. 3 is a pulse diagram illustrative of the effect of moderately changing the frequency of two identical alternating energy pulses being combined when they are precisely in synchronism.

Referring to FIG. 3, the full line waves 50 and 52 represent, for example, pulses similar to the pulse portions $V_2$ and $V_1'$, respectively of FIG. 2, when the radio frequency of the pulses is, for example, 20 megacycles and the pulses have been brought into exact synchronism (by adjustment of timing oscillator 14 of FIG. 1) as to all corresponding periods or cycles of the respective pulses from first to last, as shown. (That is, with reference to FIG. 2, T is precisely equal to δ.) If the radio frequency of the pulses is changed moderately, as for example to 18 megacycles (by adjustment means 18 of FIG. 1), the two pulses can then be represented by the dashed-line waves 54 and 56, respectively. Waves 54 and 56 will also, obviously, be in exact synchronism as to all corresponding periods or cycles from first to last, precisely as for waves 50 and 52. Accordingly, when the pulses are exactly in synchronism there should be no change in the indication of indicator 22 of FIG. 1 when the radio frequency of the pulses is changed a moderate amount, that is, as from 20 megacycles to 18 megacycles.

Figure 4:
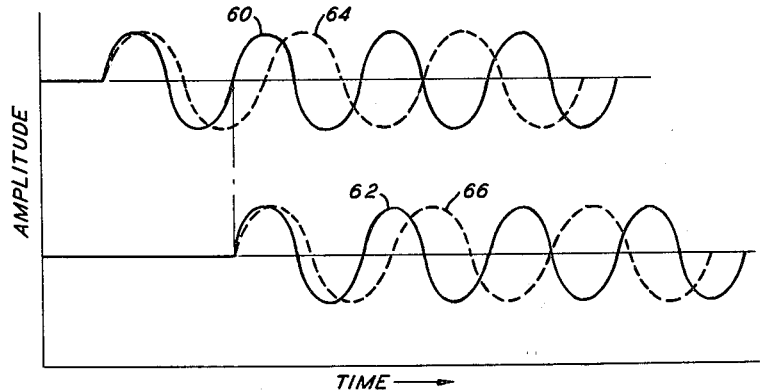
FIG. 4 is a pulse diagram illustrative of the effect of moderately changing the frequency of two identical alternating energy pulses being combined when one pulse is displaced a full period (or cycle) of the radio frequency energy of the pulses with respect to the other.

To illustrate the effect of a deviation of only one period or cycle of the radio frequency of the pulses from exact synchronism, reference may be had to FIG. 4. In FIG. 4 full line waves 60 and 62 may again represent pulses similar to the 20 megacycle pulse portions $V_2$ and $V_1'$ of FIG. 2 but with the wave 62 lagging wave 60 by one full period or cycle of the radio frequency of the pulses. This represents, of course, a very small deviation from adjustment to exact synchronism of the two pulses. In this case, except for the first period of wave 60 and the last period of wave 62, each of the periods or cycles of radio frequency of each wave is in exact synchronism with a period or cycle of the other wave. If now the frequency of the pulses is changed to 18 megacycles (by adjustment means 18 of FIG. 1) the two pulses are represented by dashed-line curves 64 and 66, respectively. Clearly, the respective periods or cycles of the curves 64 and 66 are not even approximately in synchronism and an appreciable difference should therefore be evident in this instance between the indication for 20 megacycles and the indication for 18 megacycles, respectively, afforded by the indicator 22 of FIG. 1. Further adjustment at either or both of the frequencies 18 and 20 megacycles to attain the condition illustrated by FIG. 3 should therefore be made, until changing from one frequency to the other produces no change in the indication of indicator 22, FIG. 1.

An alternate method of operating the apparatus of FIG. 1 is to continuously sweep or vary, by means 18, the radio frequency of the pulses generated by generator 12 within moderate limits of, for example, approximately plus and minus five percent while adjusting the time interval between pulses by adjustment of the frequency of oscillator 14 until a substantially constant and clean, clear maximum pulse indication (of the combined pulse portions $V_2$, $V_1'$) throughout the frequency sweep of the radio frequency is obtained on indicator 22. This, of course, signifies that precise synchronism between the pulses with respect to their corresponding periods or cycles has been effected. Such an arrangement obviously affords a quick economical way of checking the respective delays of a large number of delay lines when manufactured in "lots," all lines of each "lot" being designed to provide substantially the same delay at a specified frequency.

In some instances, it may be necessary or even more convenient to test a delay line by bonding a single transducer to one end thereof. The delay of the combination is then conveniently determined by measuring the time interval between successive echoes of a pulse applied to the transducer, the echoes appearing at the transducer at intervals each corresponding to the delay incurred by the pulse and fractional portions thereof for a "round trip" from the transducer to the far end of the delay line and back to the transducer. This type of delay line is frequently referred to as a "single-ended' delay line. It can be used to provide accurately spaced "marker" pulses for calibrating an oscilloscope trace, or as a memory unit providing accurately spaced pulses, or for a number of other purposes, as is well known to those skilled in the art. Each successive echo pulse is, of course, reduced in amplitude by the attenuation incurred in the delay line and the loss of energy represented by the preceding pulse taken from the line.

For measuring the delay of "single-ended" delay lines, a circuit as illustrated in block schematic diagram form in FIG. 5 can be employed. Nearly all of the apparatus units and major portions of the circuit of FIG. 5 can be substantially the same as the correspondingly designated units and portions of the circuit illustrated in FIG. 1. Corresponding units of the two circuits accordingly are given corresponding designation numbers, respectively, and the detailed description of such units is, of course, given hereinabove in connection with the description of the circuit of FIG. 1.

The circuit illustrated by FIG. 5 differs from that illustrated by FIG. 1 essentially in that delay line 100 is a single-ended line, that is, it has only one transducer 102 located on one of its ends (the lower end).

For each energy pulse impressed upon the transducer 102 a series of subsequently occurring pulses (echoes) will be obtained from transducer 102, as illustrated for example in FIG. 6 where for the successive input pulses $V_0$, $V_0'$, et cetera, similar series of "echo" pulses $V_1$, $V_2$, et cetera; $V_1'$, $V_2'$, et cetera, respectively, appear at transducer 102. These "echo" pulses result, of course, from successive reflections of portions of the original pulse energy. As noted hereinabove, they decrease progressively in amplitude from pulse to pulse, primarily because of attenuation in delay line member 100. Of course, energy is absorbed in the transducer and some is lost as each successive pulse from transducer 102 is applied to and absorbed in amplifier 27.

In view of the fact that delay line 100 has only a single transducer 102, the electrical radio frequency pulses from generator 12 when passed by gating amplifier 11 are applied to transducer 102 and amplifier 27 in parallel as shown in FIG. 5. Successive reflections of the resulting ultrasonic pulse generated in line 100 by the applied electrical pulse generate electrical pulses in transducer 102 at intervals of substantially twice the delay for a single trip the length of line 100 as mentioned hereinabove. Accordingly, the input to amplifier 27 comprises for each applied pulse passed by gating amplifier 11 a portion of the energy of the applied pulse followed by a series of reflected pulses spaced at regular intervals of $2\delta$ as indicated above, where $2\delta$ is the "round trip" delay in delay line 100, including its transducer 102.

Figure 8:
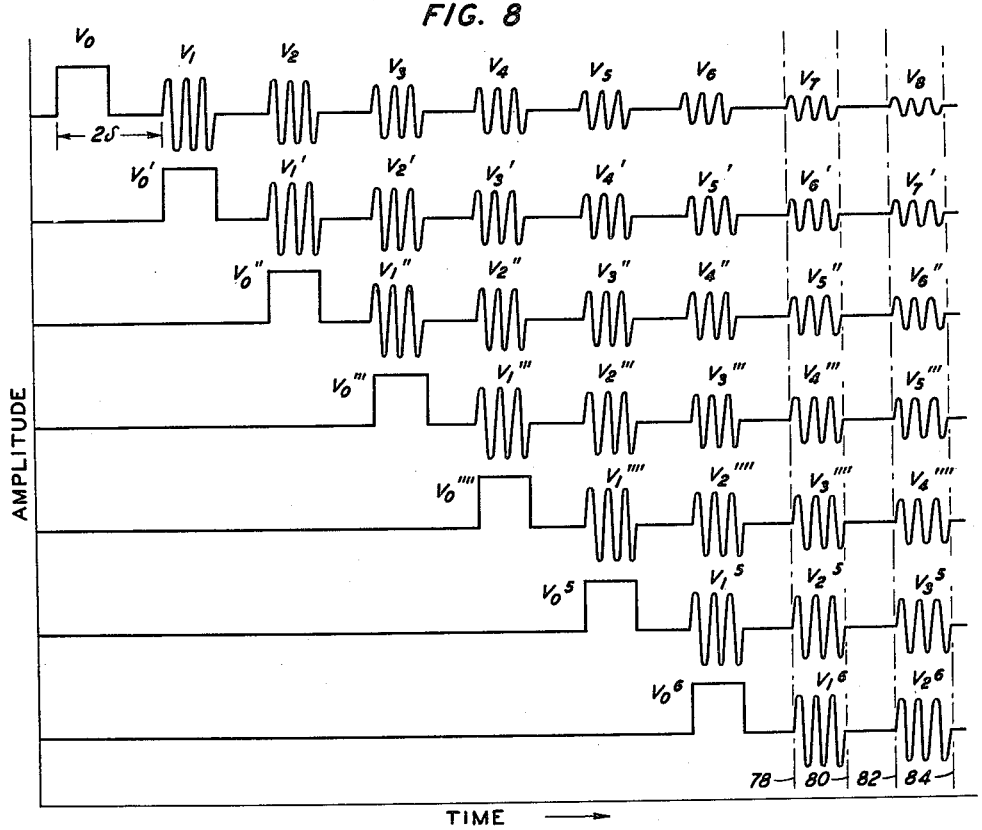
FIGS. 8 and 9 are alternate diagrams illustrative of the operation of a third timing arrangement of the pulses for a system as illustrated in FIG. 5.

The pulse diagrams of FIGS. 6, 7 and 8 represent three differing modes of operating the circuit of FIG. 5.

For operation in accordance with the diagram of FIG. 6, gate pulse generator 29 in response to pulses from trigger circuit 13 will furnish gate pulses to open gating amplifier 11 to pass every other pulse $V_0$, $V_0'$, et cetera, from radio frequency pulse generator 12. This, of course, results in the time $T'$ between these pulses $V_0$, $V_0'$, et cetera, being equal to four times the "one-way" delay of line 100 including transducer 102, that is, twice the "round trip" delay, when these pulses are precisely synchronized with echo pulses $V_2$, $V_2'$, et cetera, as shown.

Accordingly, periodically repeated pulses $V_0$, $V_0'$, $V_0''$, et cetera, from generator 12, each pulse being followed by a series of echo pulses $V_1$, $V_2$, $V_3$, et cetera; $V_1'$, $V_2'$, $V_3'$, et cetera; $V_1''$, $V_2''$, $V_3''$, et cetera, respectively, as illustrated in the pulse diagram of FIG. 6, will reach the input of amplifier 27.

Gate pulse generator 29 will also furnish pulses to oscilloscope sweep circuit 20 so that the horizontal deflection of oscilloscope 22 will take place during the intervals between the successively applied pulses $V_0$, $V_0'$, et cetera, so that when a substantially "steady state" or stabilized condition has been established the indication on the oscilloscope will comprise the sum of all the "odd numbered" reflections, that is, for example, $V_1''$, $V_3'$, $V_5$, et cetera, as indicated in the "time-slot" between the vertical dash-lines 70 and 72 of FIG. 6. For obvious reasons an interval such as that between lines 70 and 72 is usually referred to as a "time-slot." It is, of course, an interval of time during which the pulses included within the time interval as indicated for example on the diagram are simultaneously occurring. Normally a steady state condition will not be established until approximately ten pulses have been applied to the line. It is believed, however, that the restricted showing of FIG. 6 is adequate to illustrate the principles involved and nothing would be gained by adding duplicate pulse diagrams for ten or more successive applied pulses.

In a manner similar to that discussed above in connection with FIGS. 1 and 2, the time interval $T'$ between consecutive ones of the applied pulses $V_0$, $V_0'$, $V_0''$, et cetera, is adjusted by adjusting the frequency of timing oscillator 14 until a maximum indication is obtained on oscilloscope 22. The maximum indication will obviously be obtained when all of the reflected pulses such as pulses $V_1''$, $V_3'$, $V_5$, et cetera, in a selected "time-slot" are exactly in phase alignment and the time interval $T'$ will then be equal to exactly four times the delay (two "round trip" passages) of the delay line 100 and its transducer 102. The adjustment for exact synchronization should, of course, be checked as in the case of the system of FIGS. 1 and 2 by moderately changing the radio frequency of pulses from generataor 12, that is, by approximately ten percent or by sweeping the frequency of these pulses through a range of plus and minus five percent. If all pulses in the selected time-slot are exactly in phase, that is, synchronized, the change in frequency will not affect the indication on indicator 22. It is obvious from inspection of FIGS. 5 and 6 that if any two echo pulses in the same "time-slot," such as $V_1''$ and $V_3'$, are brought into exact synchronism all pulses in that time-slot and in fact in all time-slots of the diagram will be in exact synchronism.

Numerous variations of the mode of operation of the arrangement of FIG. 5 other than that conforming to the pulse pattern of FIG. 6 can, obviously, be readily devised. For example, if a pulse pattern as illustrated in FIG. 7 is established, then only every third one of the pulses from generator 12, $V_0$, $V_0'$, $V_0''$, et cetera, of FIG. 7 is passed by the gating amplifier 11. This, of course, means that in this case gating pulse generator 29 provides one gating pulse for every third timing pulse received from trigger circuit 13. The interval $T''$ between these pulses $V_0$, $V_0'$, et cetera, as per FIG. 7, when adjusted to bring all pulses in a particular selected time-slot precisely into synchronism, or phase, will then, of course, be precisely equal to three "round trip" passages in the delay line 100 or six times the one-way delay of the line. In this arrangement, either of two "time-slots," that is, that between dash-lines 74 and 75 or that between dash-lines 76 and 77, can be employed. This, of course, can be effected by arranging generator 29 to provide sweep circuit 20 with control pulses to synchronize the sweep of oscilloscope 22 with the time-slot to be observed. Since the pulses in the left time-slot (that is, between lines 74 and 75) are all of higher amplitude than the corresponding pulses in the right time-slot, the left time-slot would normally be used. As shown in FIG. 7, each slot contains alternately odd and even numbered reflected pulses. Again, precise adjustment for maximum should be checked by changing the radio frequency of the pulses from generator 12 by ten percent or by sweeping the frequency of these pulses through a range of plus and minus five percent and adjusting the interval $T''$ until identical indications are obtained for all frequencies.

The pulses diagram of FIG. 8 illustrates a still further mode of operation for the circuit of FIG. 5. In accordance with FIG. 8 a plurality of immediately successive pulses $V_0$, $V_0'$, $V_0''$, et cetera, from generator 12 are permitted to pass through gating amplifier 11 until a steady state or stabilized operating condition has been established. Thereafter one or more of the pulses from generator 12 is periodically blocked by gating amplifier 11 producing a time-slot for each blocked pulse, as, for example, that between vertical dash-lines 78 and 80, in which all of both the even and the odd numbered reflected pulses will be found.

Figure 9:
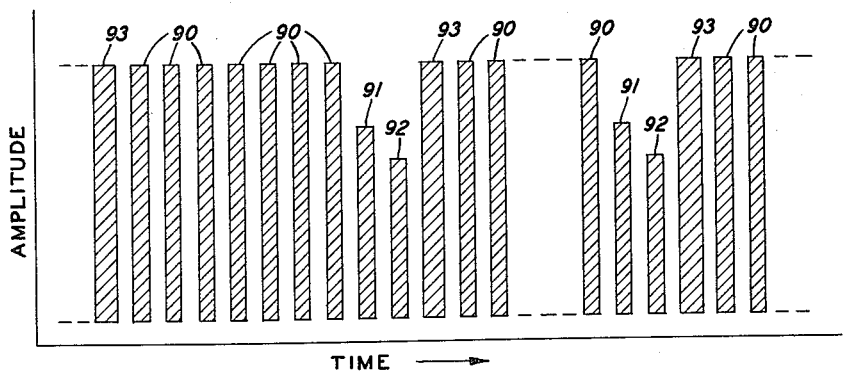

The integrated energy of the pulses in each pulsing interval or "time-slot" is represented in FIG. 9. In the "time-slots" or intervals in which a pulse from generator 12 is included (and with steady state or stabilized operation established), the energy in each interval is represented by a rectangular area 90. When one or more pulses from generator 12 are blocked, by disabling the gating amplifier 11, "time-slots" having integrated energy patterns of decreasing amplitude, such as 91 where one pulse from generator 12 has been omitted, and 92 where two successive pulses from generator 12 have been omitted, are obtained. Patterns 91 and 92 correspond, of course, to the time-slots between dash-lines 78 and 80 and between dash-lines 82 and 84, respectively, of FIG. 8.

Pulses from generator 12 are then again permitted to pass through gating amplifier 11 to re-establish a series of intervals having integrated energy patterns 90 and then one or two pulses are again omitted or blocked to again produce patterns 91 and 92. Preceding each group of regular patterns 90, one or more initial patterns such as 93 of FIG. 9 may be appreciably wider, or may differ in other respects from the steady state as represented by pattern 90, because of transient effects existing initially when pulsing from generator 12 is re-initiated but these effects will rapidly die out and the circuit will quickly reach a steady state or stabilized condition.

For such a mode of operation, gating pulse generator 29 should, of course, provide a long gating or control pulse to open gating amplifier 11 to permit a plurality of successive pulses, for example, ten pulses, from generator 12 to pass, followed by a short pulse which blocks amplifier 11 for one or two pulses. Generator 29 should, obviously, repeat the alternation of long and short control pulses regularly. Generator 29 should also provide sweep circuit 20 with a pulse so timed that the oscilloscope trace will occur during each time-slot 78—80 of FIG. 8 (or 91 of FIG. 9). Adjustment of the frequency of oscillator 14 to obtain a maximum indication on oscilloscope 22 (time-slot 78—80 or 91) will then provide a criterion of the delay of the delay line 100 which should be checked by changing the frequency and readjusting oscillator 14 as may be required to obtain no change in the indication of indicator 22 when the frequency is changed from 20 megacycles to 18 megacycles or vice versa or when the frequency is continuously varied by approximately ten percent.

From inspection of the three pulse diagrams of FIGS. 6, 7 and 8, and the text applicable to these figures, as associated with the apparatus of FIG. 5, it may be noted that whether or not specific pulses are transmitted through or blocked by gating amplifier 11 the time interval between the successive radio frequency pulses generated by generator 12 will (when the circuit has been adjusted for a maximum amplitude indication on oscilloscope 22 which does not change with moderate changes in the radio frequency) be precisely equal to a single round trip delay 2δ of the delay line. It is also apparent from inspection of the four pulse diagrams of FIGS. 2, 6, 7 and 8 and the pertinent portions of the text that the basic or generic requirement for alignment of all of the systems is the exact sychronization of the respective corresponding periods or cycles of a first and a second periodically repeated alternating energy pulse, the pulses being identical in length, phase variation and frequency but not necessarily having identical amplitudes. In FIG. 2 this is entirely obvious and the two pulses which are synchronized are of equal amplitude as well as being otherwise identical. In the remaining figures it should be readily perceived since, as mentioned hereinabove, if any echo pulse of one echo sequence of pulses is in exact synchronism with an echo pulse of another sequence then all pulses in each time-slot must necessarily be in exact synchronism.

While the illustrative embodiments described above have all employed solid delay lines in which acoustic waves are generated, it is obvious that the principles of the invention are directly applicable to the measurement of the delay of any transmission medium such as the paths traversed by radar or sonar pulses, or the like. Likewise, it is obvious that those skilled in the art can readily apply the principles of the invention to systems in which the major portions of the system are all electrical or all acoustic, respectively.

Numerous and varied other arrangements and methods and modifications of the illustrative arrangements and methods described in detail hereinabove, within the spirit and scope of the principles of the present invention will readily occur to those skilled in the art. No attempt to exhaustively illustrate all such possibilities has here been made.

What is claimed is:

1. The method of synchronizing the corresponding cycles of the corresponding pulses of two regularly recurrent successions of substantially identical multi-cycle, microwave frequency, alternating energy pulses, all pulses of both successions of pulses having identical phase variations and being at each instant of precisely the same frequency which comprises combining the corresponding pulses, measuring the amplitude of the combined pulses, varying the microwave frequency of the pulses throughout a range of approximately ten percent, and altering in identical manner the time interval between the successive pulses of each succession of pulses until the measured amplitude of the combined corresponding pulses remains at a constant maximum value over the entire range of frequency variation.

2. The method of synchronizing the corresponding cycles of the corresponding pulses of two regularly recurrent successions of substantially identical multi-cycle, microwave frequency, alternating energy pulses, all pulses of both successions of pulses having identical phase variations and being at each instant of precisely the same frequency which comprises combining the corresponding pulses, measuring the amplitude of the combined pulses, altering in identical manner the time interval between the successive pulses of each succession of pulses to obtain a maximum amplitude of the combined corresponding pulses, changing the microwave frequency of the pulses of both successions of pulses to a second microwave frequency differing from the original frequency by approximately ten percent, altering in identical manner the time interval between the successive pulses of each succession of pulses to again obtain a maximum amplitude of the combined corresponding pulses, and alternately repeating at the original and second microwave frequencies the alteration of the time interval between the successive pulses of each succession of pulses until one time interval relation between successive pulses of each of the two successions of pulses is found which provides a maximum amplitude of the combined corresponding pulses at both frequencies.

3. The method of measuring the delay of a transmission path which comprises generating a succession of identical multi-cycle alternating energy pulses of a first frequency, the pulses having identical phase variations, the time intervals between successive pulses being equal, selecting two successive pulses from the succession of pulses, transmitting substantially equal portions of the two selected pulses through the transmission path, and without delay through a second path, respectively, periodically repeating the selection of two successive pulses from the succession of pulses and the transmission of substantially equal portions of the two selected pulses through the transmission path and without delay through a second path, respectively, at periods sufficiently long that echo pulses in the transmission path shall have reached substantially negligible amplitudes, combining in each instance the portions of the two selected pulses transmitted through the transmission path and through the second path, measuring in each instance the amplitude of the combined pulse portions, adjusting the time interval between the successive generated, multi-cycle, alternating energy pulses until the amplitude of the combined pulse portions is a maximum, changing the frequency of the generated, multi-cycle, alternating energy pulses by approximately ten percent to a second frequency and again measuring the amplitude of the combined pulse portions, adjusting the time interval between the generated, multi-cycle, alternating energy pulses of the second frequency until the amplitude of the combined pulse portions is a maximum, successively changing the frequency of the generated, multi-cycle, alternating energy pulses from the second to the first frequency and vice versa and adjusting the time interval between successive generated, multi-cycle, alternating energy pulses for a maximum of the combined pulse portions until a single time interval adjustment between successive pulses of the generated, multi-cycle, alternating energy pulses is obtained which produces maximum amplitude readings at both said first and said second frequencies, whereby the delay of the transmission path will equal the time interval between successive pulses of said succession of generated, multi-cycle, alternating energy pulses for said single time interval adjustment.

4. The method of measuring the delay of a single-ended delay line which comprises impressing a regularly recurring alternating energy pulse of a first frequency on the line, the rate of recurrence of the pulse being such that the time interval between successive impressed pulses is substantially an integral number of times the round trip delay of the line, combining a plurality of echo pulses of the impressed pulses from the line, measuring the combined echo pulses, varying the time interval between successive impressed pulses to obtain a maximum amplitude of the combined echo pulses, changing the frequency of the impressed pulses by approximately ten percent, varying the time interval between successive impressed pulses to obtain a maximum amplitude of the combined echo pulses at the new frequency and alternately repeating the variation of the time interval between impressed pulses at the first frequency and the new frequency until a single time interval adjustment is found for both frequencies which produces maxima at both frequencies.

5. The method of claim 4 in which the time interval between successive impressed pulses is greater than the round trip delay of the line and echo pulses are combined and measured at an interval between successive impressed pulses.

6. The method of claim 4 in which the time interval between successive impressed pulses is substantially equal to the interval between successive echo pulses from the line, and an impressed pulse is periodically omitted and and the echo pulses are combined and measured during the interval in which the impressed pulse is omitted.

7. Apparatus for measuring the delay of a single-ended delay line comprising means for generating a regularly recurring alternating energy pulse of a first frequency, means for impressing the recurring energy pulse on the line, the rate of recurrence of the pulse being such that the time interval between successive impressed pulses is substantially an integral number of times the round trip delay of the line, means for combining a plurality of echo pulses of the impressed pulse from the line, means for measuring the combined echo pulses, means for changing the frequency of the impressed pulses by approximately ten percent, and means for varying the time interval between successive impressed pulses to obtain a maximum amplitude of the combined echo pulses which remains substantially constant with changes of frequency between the first frequency and frequencies within approximately ten percent of the first frequency.

8. Apparatus as defined in claim 7 in which the frequency changing means continuously sweeps the frequency of the impressed pulse through a range of frequencies including the first frequency, the width of the range of frequencies being substantially ten percent of the first frequency.

9. The method of claim 3, with the additional step of introducing a phase change of one hundred and eighty degrees between the circuit of the said transmission path and the circuit of the said second path whereby the adjustment of the time interval between successive generated, multi-cycle, alternating energy pulses can be made to produce a minimum amplitude indication for the combined pulse portions at both frequencies of the multi-cycle alternating energy pulses.

10. A delay measuring system for measuring the delay of a transmission path comprising means for generating a succession of identical multi-cycle alternating energy pulses of a first frequency, the pulses having identical phase variations, the pulses being equally spaced in time, means for adjusting the time interval between successive pulses of the succession of pulses, means for periodically selecting, at intervals of several times the nominal delay of the transmission path, two successive pulses from the succession of pulses, means for transmitting substantially equal portions of the two periodically selected pulses through the transmission path, and through a path having substantially no delay, means for combining the transmitted portions of the two periodically selected pulses, amplitude indicating means responsive to the combined transmitted portions of the two periodically selected pulses, means for altering the frequency of the succession of identical, multi-cycle, alternating energy pulses to a second frequency differing from the first frequency by approximately ten percent, and means for introducing a phase change of one hundred and eighty degrees between the circuit of the transmission path and the path having substantially no delay.

References Cited in the file of this patent

UNITED STATES PATENTS

| | | |
|---|---|---|
| 2,414,477 | Meacham | Jan. 21, 1947 |
| 2,525,328 | Wolff | Oct. 10, 1950 |
| 2,602,834 | Leslie et al. | July 8, 1952 |
| 2,612,772 | McConnell | Oct. 7, 1952 |
| 2,623,106 | Fassberg | Dec. 23, 1952 |
| 2,800,627 | Oudin et al. | July 23, 1957 |
| 2,866,157 | Casabona | Dec. 23, 1958 |
| 2,870,402 | Corr et al. | Jan. 20, 1959 |
| 2,877,414 | Pope | Mar. 10, 1959 |
| 2,939,075 | Schwab | May 31, 1960 |